(12) United States Patent
Weng (10) Patent No.: US 11,280,313 B2
(45) Date of Patent: Mar. 22, 2022

(54) ROTOR FOR POWER DRIVING

(71) Applicant: Zhen-Guo Weng, Kaohsiung (TW)

(72) Inventor: Zhen-Guo Weng, Kaohsiung (TW)

( * ) Notice: Subject to any disclaimer, the term of this patent is extended or adjusted under 35 U.S.C. 154(b) by 0 days.

(21) Appl. No.: 17/151,775

(22) Filed: Jan. 19, 2021

(65) Prior Publication Data
US 2021/0140404 A1 May 13, 2021

Related U.S. Application Data

(63) Continuation of application No. PCT/CN2019/080711, filed on Apr. 1, 2019.

(30) Foreign Application Priority Data

Feb. 1, 2019 (CN) .......................... 201910104976.6

(51) Int. Cl.
*F03D 1/06* (2006.01)

(52) U.S. Cl.
CPC ......... *F03D 1/0625* (2013.01); *F03D 1/0633* (2013.01); *F03D 1/0666* (2013.01); *F05B 2240/311* (2013.01)

(58) Field of Classification Search
CPC .... F03D 1/0625; F03D 1/0633; F03D 1/0666; F03D 1/0675; F03D 3/002; F03D 3/062; F03B 3/12; F03B 3/121; F03B 3/126; F05B 2240/311; F05B 2210/16; Y02E 10/74; Y02E 10/20; Y02E 10/72
See application file for complete search history.

(56) References Cited

U.S. PATENT DOCUMENTS

| | | | | |
|---|---|---|---|---|
| 1,511,965 | A * | 10/1924 | Hennigh | G09F 7/22 40/479 |
| 4,533,297 | A * | 8/1985 | Bassett | F03D 1/0658 416/132 B |
| 8,035,245 | B1 * | 10/2011 | Simnacher | F03D 3/068 290/55 |
| 8,414,266 | B2 * | 4/2013 | Lam | F03D 7/06 416/147 |
| 9,866,094 | B2 * | 1/2018 | Huang | F03D 3/064 |

(Continued)

FOREIGN PATENT DOCUMENTS

| CN | 1721691 A | 1/2006 |
|---|---|---|
| CN | 101737252 A | 6/2010 |

(Continued)

*Primary Examiner* — David E Sosnowski
*Assistant Examiner* — Wayne A Lambert
(74) *Attorney, Agent, or Firm* — Karin L. Williams; Alan D. Kamrath; Mayer & Williams PC (57) ABSTRACT

A rotor (10) for power driving includes a hub (12), a plurality of fixed jibs (14), and a plurality of vanes (16). The hub (12) is adapted to be coupled with a mechanical shaft (24) which is driven by winds, water flows or tides as driving sources. The fixed jibs (14) are arranged around the hub (12) circumferentially and spaced from one another. Each fixed jib (14) extends in a radial direction perpendicular to an axial direction of the shaft (24). Each vane (16) is elastically fixed at one of the fixed jibs (14) such that the vanes (16) on which external forces act are elastically movable relative to the fixed jibs (14) and rebound after removal of the external forces.

18 Claims, 11 Drawing Sheets

(56) References Cited

U.S. PATENT DOCUMENTS

| | | | |
|---|---|---|---|
| 2004/0164561 A1* | 8/2004 | Nagawa | F03D 3/067 290/55 |
| 2005/0074323 A1* | 4/2005 | Chio | F03D 3/068 415/4.2 |
| 2908/0292460 | 11/2008 | Kuo et al. | |
| 2009/0035135 A1* | 2/2009 | Martinez Penades | F03D 3/067 416/131 |
| 2009/0169382 A1* | 7/2009 | Bond | F03D 3/067 416/133 |
| 2009/0297347 A1* | 12/2009 | Burr | F03B 17/067 416/98 |
| 2010/0232960 A1* | 9/2010 | Larsen | F03D 3/067 416/23 |
| 2011/0255954 A1* | 10/2011 | Chen | F03D 3/064 415/4.2 |
| 2012/0134823 A1* | 5/2012 | Tully | F03D 1/0633 416/131 |
| 2012/0189446 A1* | 7/2012 | Saarem | F03D 3/067 416/13 |
| 2012/0207601 A1* | 8/2012 | Wang | F03D 3/067 416/9 |
| 2017/0211544 A1* | 7/2017 | Olivera | F03D 3/068 |

FOREIGN PATENT DOCUMENTS

| | | |
|---|---|---|
| CN | 201599137 U | 10/2010 |
| CN | 202510288 | 10/2012 |

\* cited by examiner

ROTOR FOR POWER DRIVING

CROSS REFERENCE TO RELATED APPLICATION

This is a continuation application of and claims priority to PCT/CN2019/080711 filed on Apr. 1, 2019, which claims priority to China Patent Application No. CN201910104976 filed on Feb. 1, 2019, the entire content of which is hereby incorporated by reference.

BACKGROUND OF THE INVENTION

1. Field of the Invention

The present invention relates to a rotor for power driving and, more particularly, to a mechanical rotor for power driving based on fluids such as winds, water flows or tides as driving sources.

2. Description of the Related Art

An electric generator driven by winds, water flows or tides usually consists of a rotor, a transmission system, a power generation system, and a tower pillar. The rotor is installed on a shaft and includes vanes on which fluids (gaseous or liquid) act. With vanes sustaining forces of airflows, the rotor rotates around the shaft for energy conversion from wind energy to mechanical energy which will be transferred to the power generation system through the acceleratory transmission system for generation of useful electric energy. Moreover, based on a rotor rotating around a shaft and matching a transmission system, there is a kind of windmill that is competent in running irrigation equipment or a grain husker.

A traditional rotor includes a hub mounted on a shaft, a plurality of holders arranged on the hub radially, and at least one moveable vane as well as at least one barrier member, both of which are installed on each holder. The movable vane is rotatable relative to the holder, and the barrier member restricts a rotary movement of the moveable vane at a specific angle. When the moveable vane on which winds act rotates a default angle and contacts the barrier member, the moveable vane creates resistance to air flows, so that the rotor rotates around the shaft. However, the moveable vanes easily worn after wind-induced rotary movements relative to the holders need to be maintained or repaired frequently and are denounced for its short service life. Additionally, the traditional rotor is made up of a relatively large number of parts, and hence has a complicated structure, time-consuming assembly, and relatively high cost.

BRIEF SUMMARY OF THE INVENTION

Thus, an objective of the present invention is to provide a rotor for power driving which is characteristic of fixed elastic vanes for a simplified structure and a better service life.

To achieve this and other objectives, a rotor for power driving of the present invention includes a hub, a plurality of first fixed jibs, and a plurality of inner vanes. The hub is adapted to be coupled with a mechanical shaft which is driven by winds, water flows or tides as driving sources. The plurality of first fixed jibs is installed around the hub circumferentially and spaced from one another. Each of the plurality of first fixed jibs extends in a radial direction perpendicular to an axial direction of the shaft. The plurality of first fixed jibs can be rotated about the shaft to define a plane of rotation perpendicular to the axial direction of the shaft. Each inner vane is elastically fixed at a corresponding first fixed jib and extends outwardly from an outer surface of the corresponding first fixed jib in a direction parallel to the plane of rotation such that the plurality of inner vanes on which external forces act are elastically movable relative to the plurality of first fixed jibs to drive the plurality of first fixed jibs to rotate along a single fixed direction on the plane of rotation and can rebound after removal of the external forces.

In an embodiment, the inner vane is made of an elastic material and has one side connected to the corresponding first fixed jib such that the plurality of inner vanes on which the external forces act make no rotary movement relative to the plurality of first fixed jibs but are bent.

In an embodiment, the inner vane is made of a rigid material and an elastic connecting member is installed between the inner vane and the corresponding first fixed jib. The elastic connecting member has an internal end connected to the corresponding first fixed jib and an external end connected to the inner vane. In another embodiment, two spaced springs are installed between the inner vane and the corresponding first fixed jib. Each spring includes first and second ends. The first ends of the two springs respectively abut against the corresponding first fixed jib and the second ends of the two springs respectively abut against two opposite sides of the inner vane such that the plurality of inner vanes can swing relative to the plurality of first fixed jibs. One of the two springs provides the inner vane with elastic recovery in a first swing direction perpendicular to the plane of rotation, and another one of the two springs provides the inner vane with elastic recovery in a second swing direction opposite to the first swing direction.

In a preferred embodiment, each first fixed jib includes a first end connected to the hub and a second end kept away from the hub. The rotor further includes a plurality of second fixed jibs and a plurality of outer vanes. Each second fixed jib is engaged on the second end of one of the plurality of first fixed jibs, and each outer vane is elastically fixed at a corresponding second fixed jib such that the plurality of outer vanes on which external forces act are elastically movable relative to the plurality of second fixed jibs and can rebound after removal of the external forces.

In an embodiment, each second fixed jib extends in a longitudinal direction perpendicular to the radial direction. Each outer vane extends toward a direction tilt but not perpendicular to the radial direction.

The present invention will become clearer in light of the following detailed description of illustrative embodiments of this invention described in connection with the drawings.

DESCRIPTION OF THE DRAWINGS

The illustrative embodiments may best be described by reference to the accompanying drawings where.

DETAILED DESCRIPTION OF THE INVENTION

Figure 1:
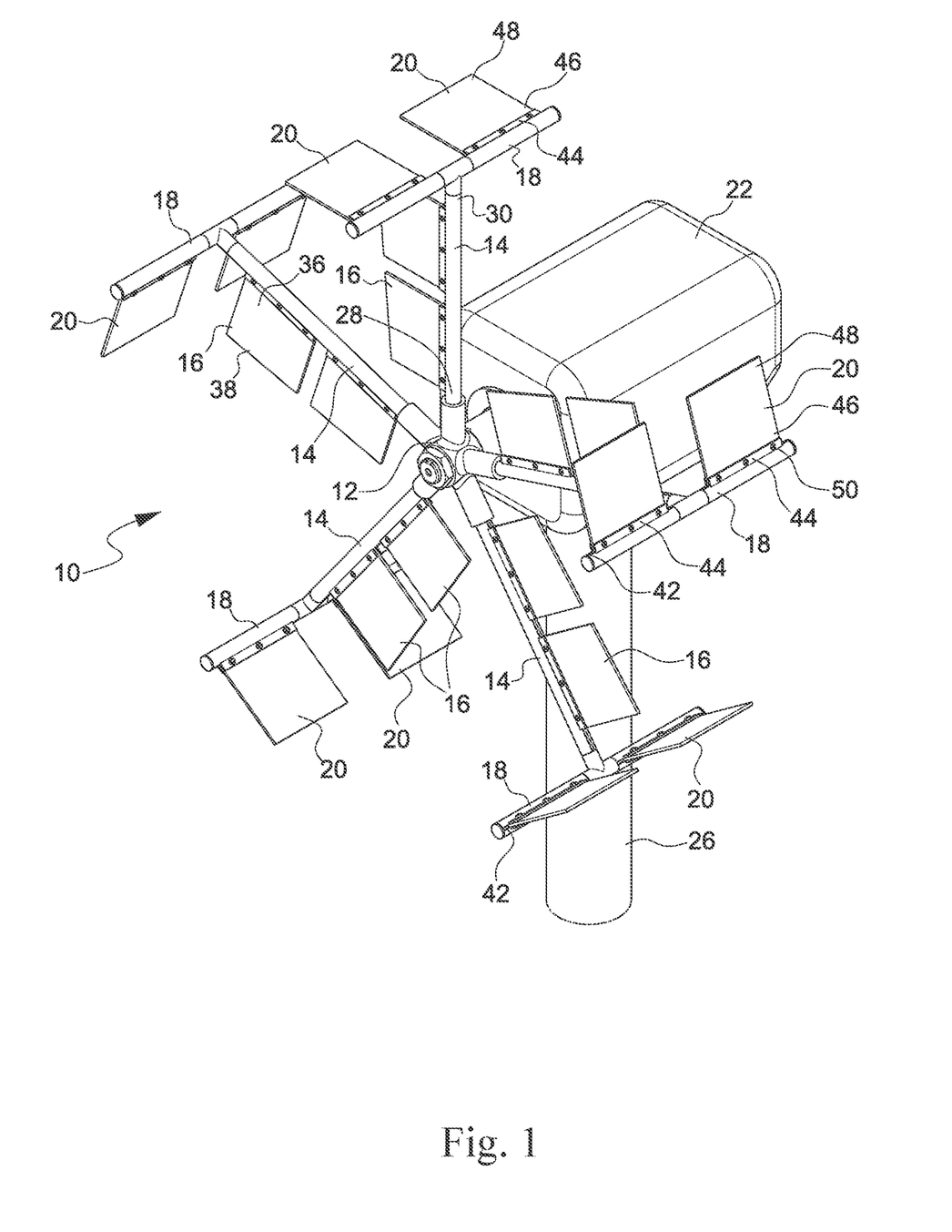
FIG. 1 is a perspective view of a rotor in accordance with a first embodiment of the present invention, with the rotor assembled with a shaft of a wind-driven electric generator.
Figure 2:
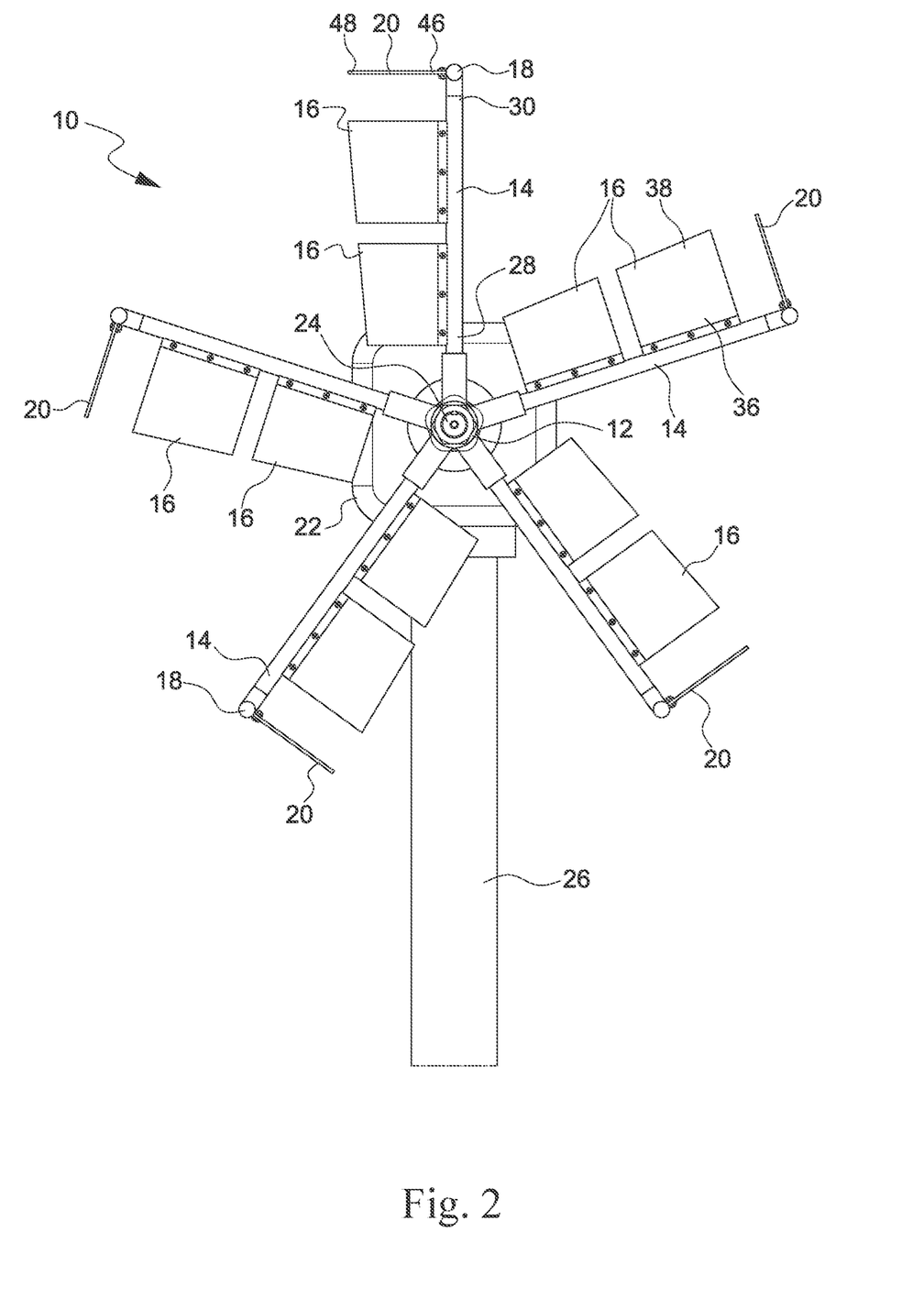
FIG. 2 is a plane view of the rotor and the electric generator in FIG. 1.
Figure 3:
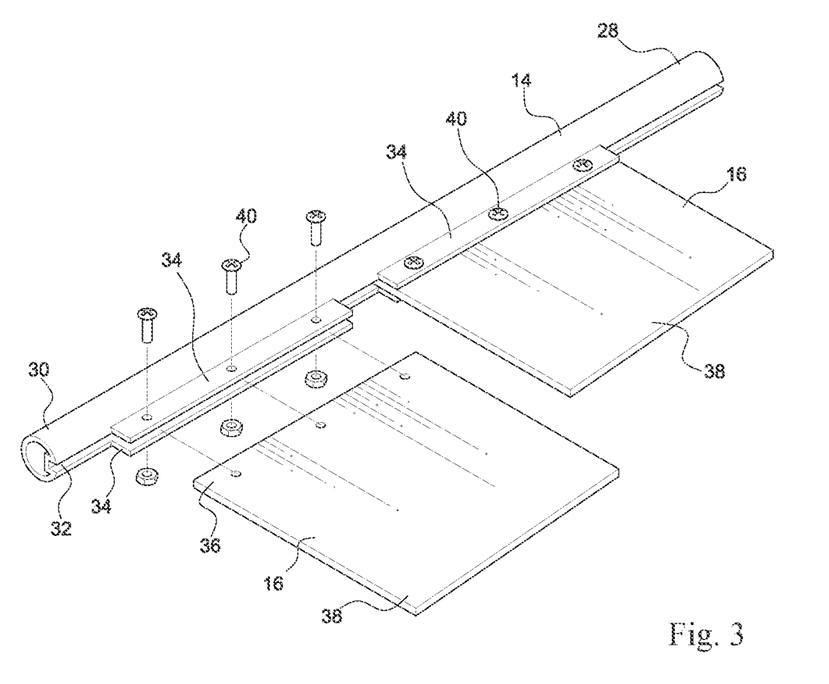
FIG. 3 is an exploded, schematic view for a first fixed jib and inner vanes of the rotor in FIG. 1.

A rotor 10 for power driving according to a first embodiment of the present invention is shown in FIGS. 1 through 3 of the drawings and is created for applications in fluids such as airflows (winds), water flows and tides, so that kinetic energies of fluids can drive the rotor 10 to rotate and further an appliance (for example, irrigation equipment or grain husker) to run or can be transmitted to a power generation system for electricity generation.

In this embodiment, a power generation system is demonstrated particularly. The rotor 10 includes a hub 12, a plurality of first fixed jibs 14, at least one inner vane 16 mounted on each first fixed jib 14, a plurality of second fixed jibs 18, and at least one outer vane 20 mounted on each second fixed jib 18. The hub 12 is adapted to be coupled with a shaft 24 of an electric generator 22. The electric generator 22 is supported on a tower pillar 26 such that the center of rotation of the rotor 10 is kept at a certain level. The electric generator 22 is known to people skilled in the art in structure and can be replaced by another power unit. Thus, the electric generator 22 is excluded from technical specialties and not discussed in the present invention.

In this embodiment, the rotor 10 includes five first fixed jibs 14 and five second fixed jibs 18. In a feasible embodiment, the rotor 10 includes three, four, or more than five first and second fixed jibs 14 and 18. The five first fixed jibs 14 are installed around the hub 12 and spaced apart along a circumferential direction of the hub 12. Each first fixed jib 14 extends in a radial direction perpendicular to an axial direction of the shaft 24 and includes a first end 28 connected to the hub 12 and a second end 30 kept away from the hub 12. Each first fixed jib 14 is a cylindrical pole made of a rigid material. A groove 32 is formed in an outer surface of each first fixed jib 14 and extends in a lengthwise direction of the first fixed jib 14 (the radial direction mentioned previously). In this embodiment, the outer surface of each first fixed jib 14 is further provided with two pairs of clamp portions 34 spaced from each other. Each pair of clamp portions 34 protrude outwardly from the outer surface of the first fixed jib 14 and are separated by the groove 32.

In this embodiment, two spaced inner vanes 16 are mounted on each first fixed jib 14, and each of the inner vanes 16 is elastically fixed at the first fixed jib 14 such that no rotary movement of the inner vane 16 relative to the first fixed jib 14 under an external force is made but the inner vane 16 is bent and resilient after removal of the external force. In this embodiment, the inner vane 16 is made of an elastic material and has a first side 36 connected to the first fixed jib 14 and a second side 38 kept away from the first fixed jib 14. The first side 36 of each inner vane 16 is engaged in the groove 32 in the first fixed jib 14 and stays inside an associated pair of clamp portions 34. The inner vane 16 is non-rotationally fixed at the first fixed jib 14 with the pair of clamp portions 34 and the first side 36 of the inner vane 16 penetrated by fasteners 40 (for example, screws).

In this embodiment, each second fixed jib 18 is mounted on the second end 30 of one of the first fixed jibs 14 and extends in a longitudinal direction perpendicular to the radial direction. Each second fixed jib 18 is a cylindrical pole made of a rigid material and similar to the first fixed jib 14 structurally. An outer surface of each second fixed jib 18 is provided with a groove 42 and two pairs of clamp portions 44 spaced from each other for the outer vane 20 to be combined. The groove 42 extends in a lengthwise direction of the second fixed jib 18 (the longitudinal direction mentioned previously). Each pair of clamp portions 44 protrude outwardly from the outer surface of the second fixed jib 18 and are separated by the groove 42.

In this embodiment, two spaced outer vanes 20 are mounted on each second fixed jib 18, and each of the outer vanes 20 is elastically fixed at the second fixed jib 18 such that no rotary movement of the outer vane 20 relative to the second fixed jib 18 under an external force is made but the bent outer vane 20 is bent and resilient after removal of the external force. In this embodiment, each outer vane 20 similar to the inner vane 16 structurally is made of an elastic material. The outer vane 20 extending in the longitudinal direction has a first side 46 connected to the second fixed jib 18 and a second side 48 kept away from the second fixed jib 18. The first side 46 of the outer vane 20 is engaged in the groove 42 in the second fixed jib 18 and stays inside an associated pair of clamp portions 44. The outer vane 20 is non-rotationally fixed on the second fixed jib 18 with the pair of clamp portions 44 and the first side 46 of the outer vane 20 penetrated by fasteners 50 (for example, screws).

Figure 4:
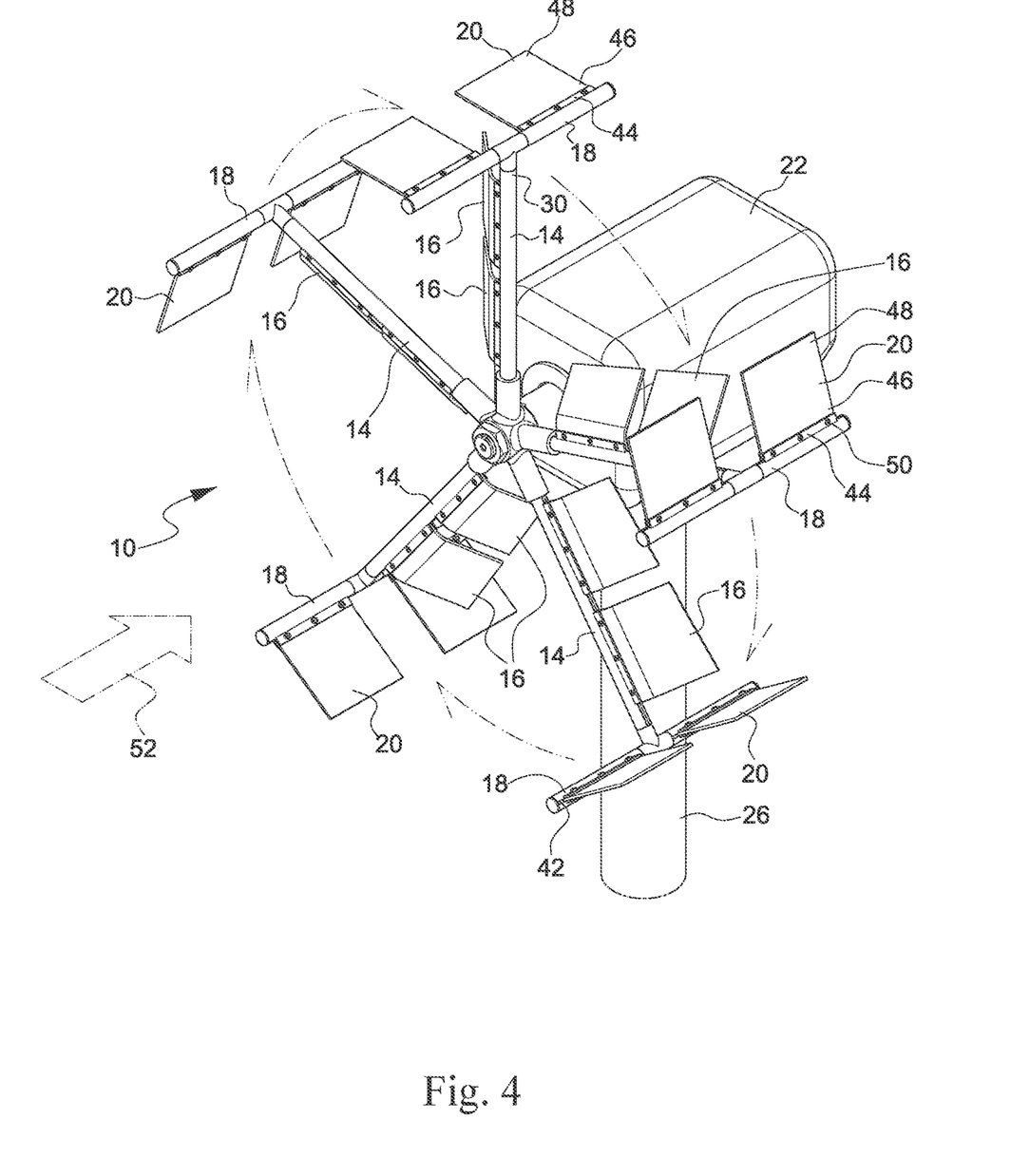
FIG. 4 is a schematic view which illustrates the rotor in FIG. 1 rotating when winds act on partial inner vanes of the rotor.
Figure 5:
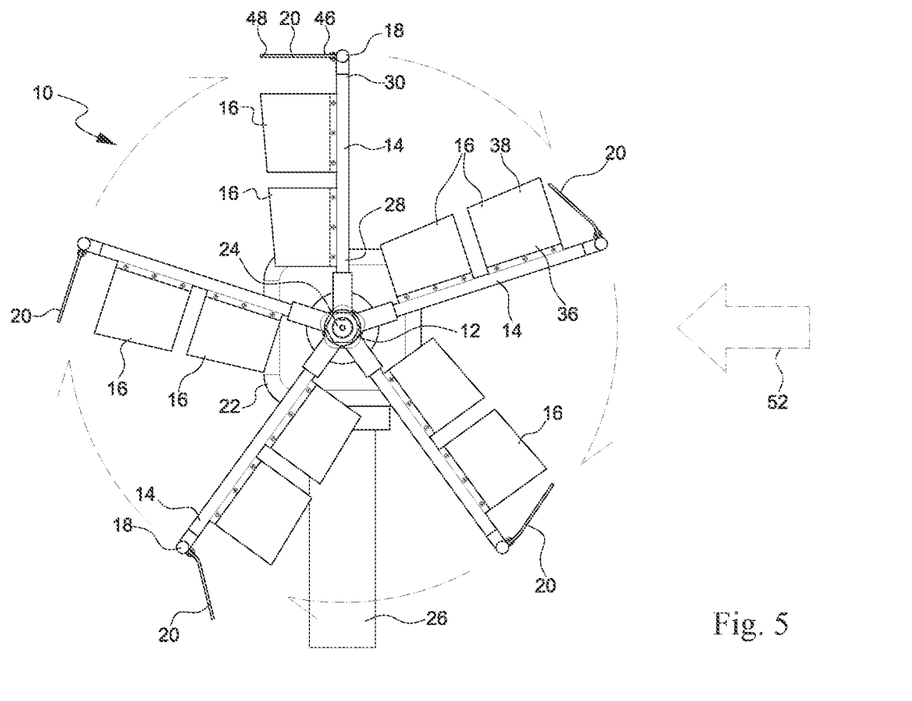
FIG. 5 is a schematic view which illustrates the rotor in FIG. 1 rotating when winds act on partial outer vanes of the rotor.

In practice, the rotor 10 of the present invention can be driven by airflows (winds), water flows or tides. Based on airflows as driving sources, the rotor 10 is erected on the ground. Based on water flows or tides as driving sources, the rotor 10 is immersed in water. In this embodiment, the rotor 10 relies on airflows as driving sources to run in practice. As shown in FIG. 4, when winds (air flows) 52 are blown toward the rotor 10 in a direction generally perpendicular or at an angle to the inner vanes 16, at least partial inner vanes 16 will be bent relative to the first fixed jibs 14 under action of winds 52 to create resistance to winds and hence to drive the first fixed jibs 14, so that the rotor 10 is rotated about the shaft 24 clockwise (as shown in dash lines in FIG. 4, a plane of rotation for the first fixed jibs 14 is defined by the circular dash lines in FIG. 4 and perpendicular to the axial direction of the shaft 24) to drive the shaft 24, thereby transmitting wind energy to a power generation system in the electric generator 22 to generate electricity. In contrast, when winds 52 in FIG. 4 blowing reversely to the rotor 10, at least partial inner vanes 16 are also subjected to the wind force to cause the inner vanes 16 to bend relative to the first fixed jib 14, making the rotor 10 rotated clockwise to drive the shaft 24. Thus, the inner vanes 16 on which external forces act are elastically movable relative to the first fixed jibs 14 to drive the first fixed jibs 14 to rotate along a single fixed direction on the plane of rotation and can rebound after removal of the external forces. On the other hand, as shown in FIG. 5, bending deflections of at least partial outer vanes 20 relative to the second fixed jibs 18 under action of winds 52 blown to the outer vanes 20 of the rotor 10 perpendicularly or at any angle make the rotor 10 rotated clockwise (as shown in dash lines in FIG. 5) and drive the shaft 24, thereby transmitting wind energy to the power generation system in the electric generator 22 to generate electricity. Accordingly, the rotor 10 can be driven to rotate for electricity generation from wind energy effectively with winds 52 in different directions acting on at least partial inner vanes 16 and/or outer vanes 20.

In the present invention, the vanes (inner and outer vanes 16 and 20) of the rotor 10 are elastically fixed on the fixed jibs (first and second fixed jibs 14 and 18). Since the vanes 16, 20 are not rotated relative to the fixed jibs 14, 18 when subjected to the wind force, and can return to the original fixed position after removal of the wind force, there is no need to additionally install the prior art barrier members with which vanes are rotated within certain angles for simplifying structure and assembly of the rotor 10. Moreover, since the inner and outer vanes 16 and 20 do not rotate relative to the first and second fixed jibs 14 and 18, the wear problem caused by the rotation can be improved, and thus the service lives of the inner and outer vanes 16 and 20 can be effectively improved.

Figure 6:
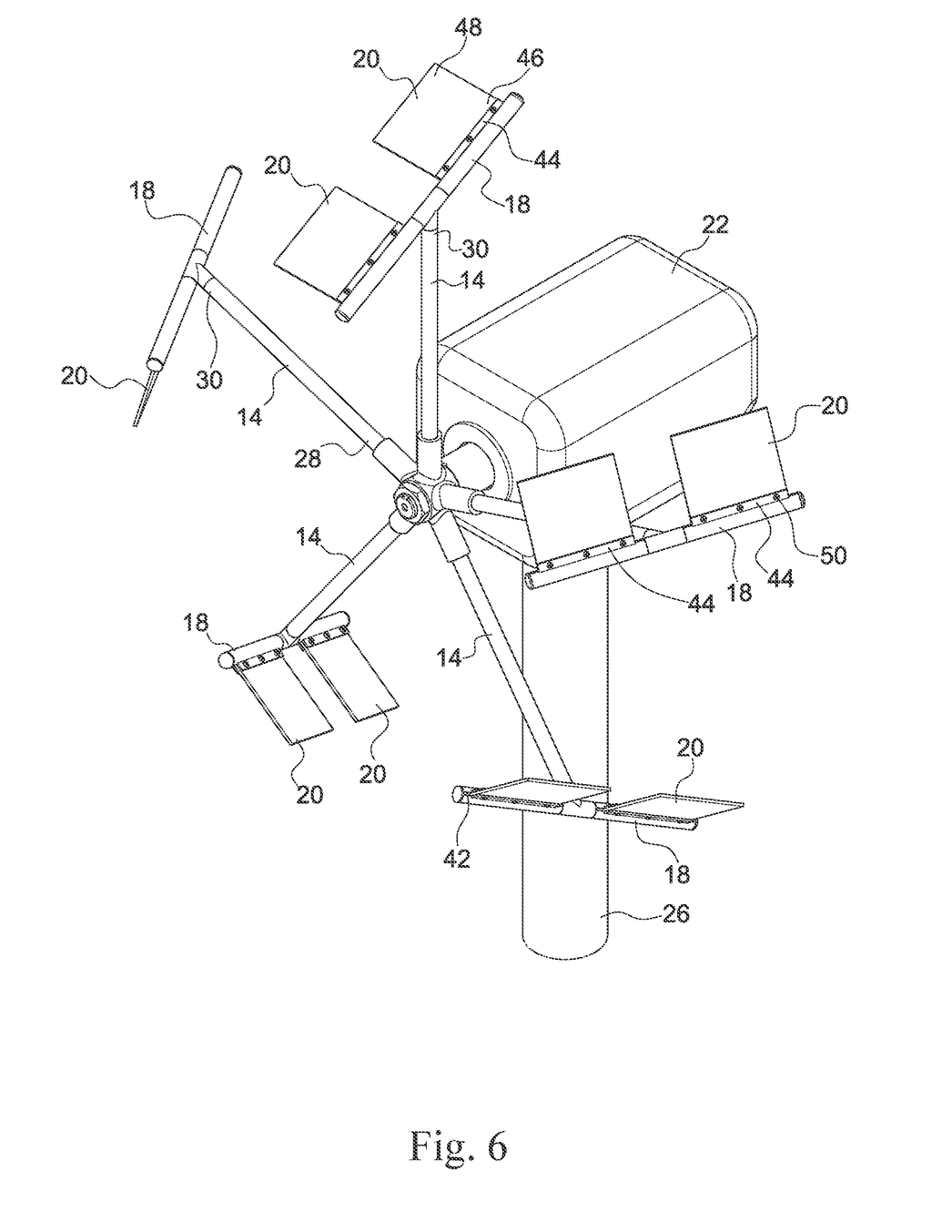
FIG. 6 is a perspective view similar to FIG. 1, illustrating a rotor in accordance with a second embodiment of the present invention.
Figure 7:
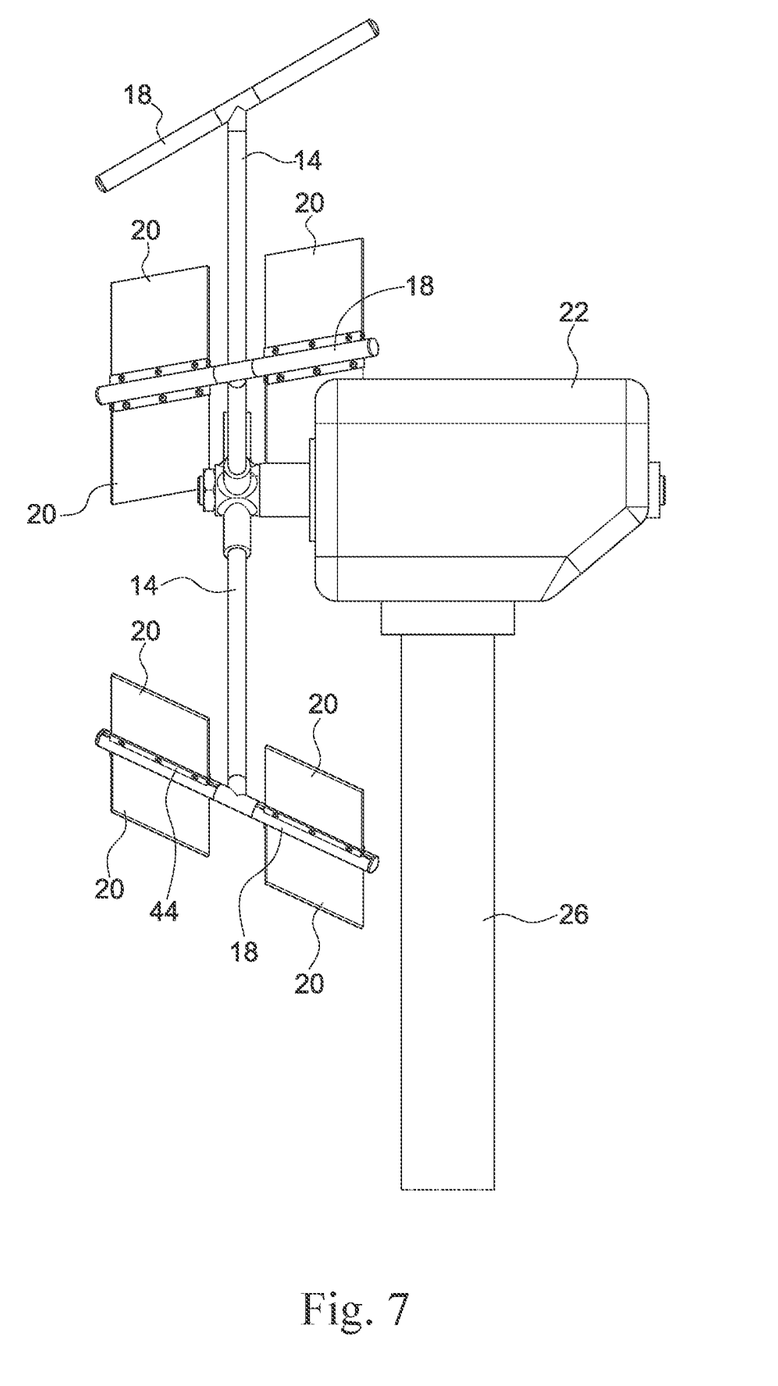
FIG. 7 is a plane view of the rotor and the electric generator in FIG. 6.

FIGS. 6 and 7 illustrate a rotor 10 in a second embodiment of the present invention. In this embodiment, the second fixed jib 18 extends toward a direction not parallel to the axial direction of the shaft 24, and the outer vane 20 extends toward a direction tilt but not perpendicular to the radial direction.

Figure 8:
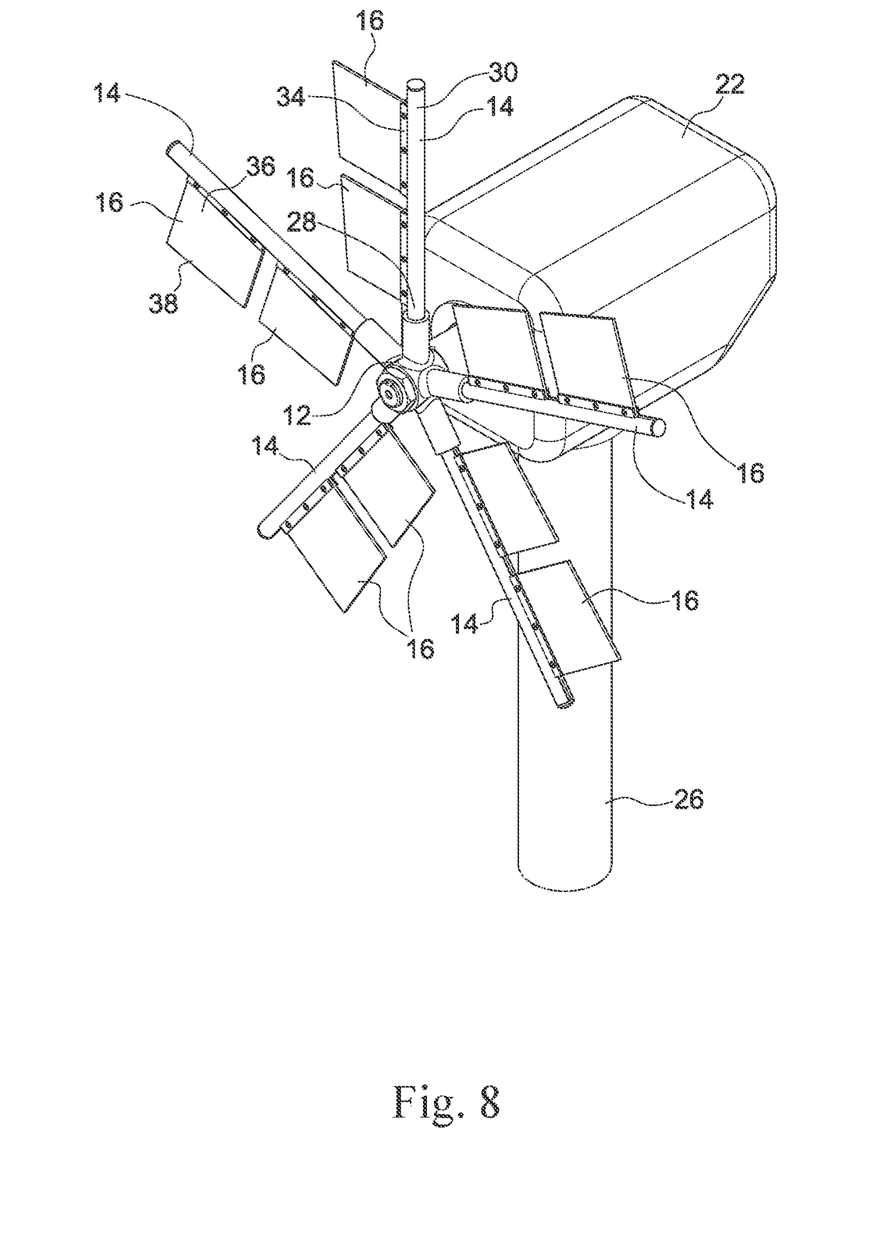
FIG. 8 is a perspective view similar to FIG. 1, illustrating a rotor in accordance with a third embodiment of the present invention.
Figure 9:
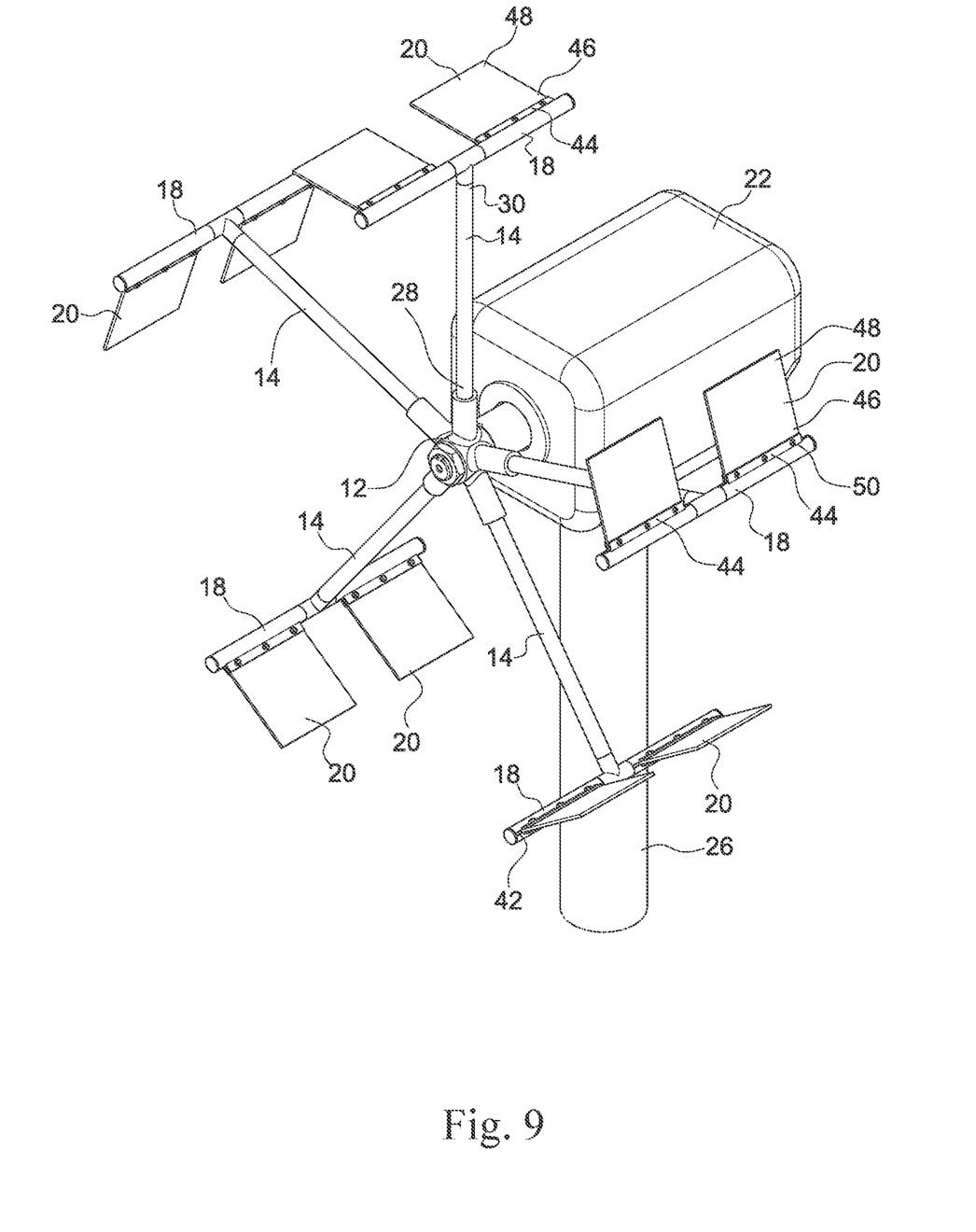
FIG. 9 is a perspective view similar to FIG. 1, illustrating a rotor in accordance with a fourth embodiment of the present invention.

FIGS. 8 and 9 illustrate rotors 10 in third and fourth embodiments of the present invention. The rotor 10 in FIG. 8 is not provided with the second fixed jibs 18 and the outer vanes 20. The rotor 10 in FIG. 9 is not equipped with the inner vanes 16.

Figure 10:
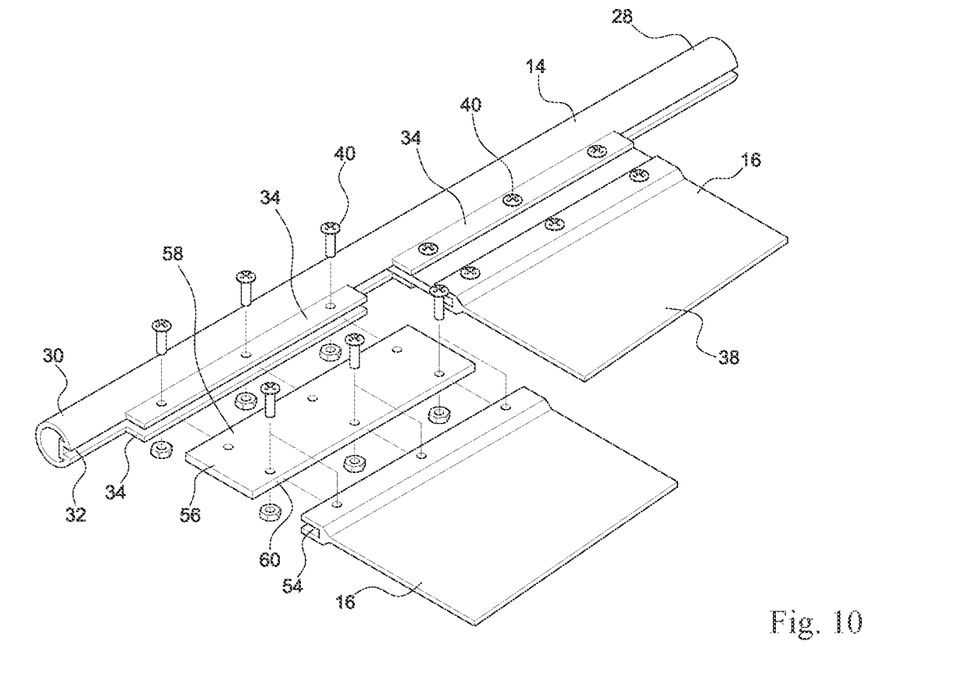
FIG. 10 is a perspective view similar to FIG. 3, illustrating a fixed jib and vanes in another embodiment of the present invention.
Figure 11:
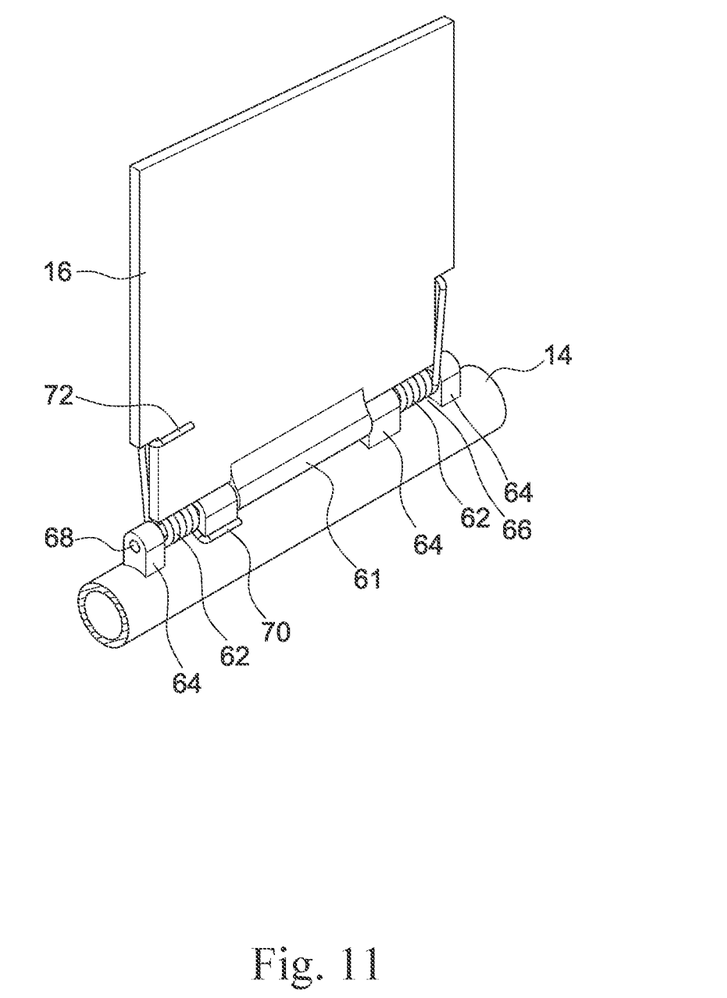
FIG. 11 is a perspective view which illustrates a fixed jib and vanes in a further embodiment of the present invention.

The fixed jibs (the first and second fixed jibs 14 and 18) and the vanes (the inner and outer vanes 16 and 20) of the present invention are further demonstrated in other feasible embodiments as shown in FIGS. 10 and 11. In this embodiment as shown in FIG. 10, the inner vane 16 (or the outer vane 20) is made of a rigid material and has a slot 54 in one end thereof. Moreover, an elastic connecting member 56 is installed between the inner vane 16 and the first fixed jib 14 and has an internal end 58 and an external end 60. The internal end 58 is engaged in the groove 32 of the first fixed jib 14 and fastened with fasteners 40 (for example, screws), and the external end 60 is engaged in the slot 54 of the inner vane 16 and fastened with fasteners 40 (for example, screws). In virtue of the elastic connecting member 56, the inner vane 16 is elastically fixed at the first fixed jib 14 and can be swung or tilted at an angle (not shown) relative to the first fixed jib 14 under action of an external force which induces no rotary movement of the inner vane 16 relative to the first fixed jib 14.

In this embodiment of FIG. 11, the inner vane 16 (or the outer vane 20) is made of a rigid material, and a connective portion 61 is designed at one side of the inner vane 16. Two springs 62 are installed between the inner vane 16 and the first fixed jib 14. Two pairs of lugs 64 are designed on and protrudes outward from an outer surface of the first fixed jib 14 (or the second fixed jib 18), and an accommodation space 66 is defined between each pair of lugs 64 for receiving one of the springs 62. The two pair of lugs 64, the springs 62 and the connective portion 61 of the inner vane 16 are penetrated by an axle 68 such that two ends 70, 72 of each spring 62 abut against the first fixed jib 14 and the inner vane 16, respectively. Thus, the inner vanes 16 can swing relative to the first fixed jibs 14 with one of the two springs 62 providing the inner vane 16 with elastic recovery in a first swing direction perpendicular to the plane of rotation, and with the other of the two springs 62 providing the inner vane 16 with elastic recovery in a second swing direction opposite to the first swing direction. Accordingly, when an external force is applied on the inner vane 16 (or the outer vane 20) elastically fixed on the first fixed jib 14 (or the second fixed jib 18), no rotary movement of the inner vane 16 (or the outer vane 20) relative to the first fixed jib 14 (or the second fixed jib 18) is made but the inner vane 16 (or the outer vane 20) will swing an angle and can return to the original state when the external force is removed.

The foregoing description only illustrates several preferred embodiments of the present application. Any known technique for facilitating the elastic attachment of the inner blade 16 to the first fixed jib 14 or for facilitating the elastic attachment of the outer vane 20 to the second fixed jib 18 should be within the scope of the feasible embodiment of the present application. In a feasible embodiment, in addition to the use of springs, the inner vane 16 (the outer vane 20) can be elastically fixed or positioned on the first fixed jib 14 (the second fixed jib 18) through magnetic objects in between. For example, a first magnetic object is installed on each of the inner and outer vanes 16, 20 to be pivotally connected to the first and second fixed jibs 14, 18 and a second magnetic object corresponds to the first magnetic object is mounted on each of the first and second fixed jibs 14, 18. Accordingly, the inner vane 16 (the outer vane 20) can be magnetically positioned at a corresponding first fixed jib 14 (a corresponding second fixed jib 18), and the inner vane 16 (the outer vane 20) on which external forces act will swing an angle relative to the first fixed jib 14 (or the second fixed jib 18) and can rebound by the magnetic effect after removal of the external forces according to first and second magnetic objects, both of which attract or repel each other.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A rotor for power driving comprising:
   a hub adapted to be coupled with a shaft;
   a plurality of first fixed jibs installed around the hub circumferentially and spaced from one another, with each of the plurality of first fixed jibs extending in a radial direction perpendicular to an axial direction of the shaft, wherein the plurality of first fixed jibs can be rotated about the shaft to define a plane of rotation perpendicular to the axial direction of the shaft; and
   a plurality of inner vanes each elastically fixed at a corresponding first fixed jib and extending outwardly from an outer surface of the corresponding first fixed jib in a direction parallel to the plane of rotation when not acted upon by external forces such that the plurality of inner vanes, when acted upon by the external forces, vanes elastically movable relative to the plurality of first fixed jibs to drive the plurality of first fixed jibs to rotate along a single fixed direction on the plane of rotation and can rebound after removal of the external forces.

2. The rotor for power driving as claimed in claim 1, wherein the inner vane is made of an elastic material and has one side connected to the corresponding first fixed jib such that the plurality of inner vanes on which the external forces act make no rotary movement relative to the plurality of first fixed jibs but are bent.

3. The rotor for power driving as claimed in claim 1, wherein the inner vane is made of a rigid material and an elastic connecting member is installed between the inner vane and the corresponding first fixed jib, with the elastic connecting member having an internal end connected to the corresponding first fixed jib and an external end connected to the inner vane such that the plurality of inner vanes is elastically fixed at the plurality of first fixed jibs.

4. The rotor for power driving as claimed in claim 1, wherein the inner vane is made of a rigid material and two spaced springs are installed between the inner vane and the corresponding first fixed jib, with each spring including first and second ends, with the first ends of the two springs respectively abutting against the corresponding first fixed jib and the second ends of the two springs respectively abutting against two opposite sides of the inner vane such that the plurality of inner vanes can swing relative to the plurality of first fixed jibs, wherein one of the two springs provides the inner vane with elastic recovery in a first swing direction perpendicular to the plane of rotation, and another one of the two springs provides the inner vane with elastic recovery in a second swing direction opposite to the first swing direction.

5. The rotor for power driving as claimed in claim 1, wherein each first fixed jib includes a first end connected to the hub and a second end kept away from the hub, with the rotor further comprising:
 a plurality of second fixed jibs each engaged on the second end of one of the plurality of first fixed jibs; and
 a plurality of outer vanes each elastically fixed at a corresponding second fixed jib such that the plurality of outer vanes on which external forces act are elastically movable relative to the plurality of second fixed jibs and can rebound after removal of the external forces.

6. The rotor for power driving as claimed in claim 5, wherein the outer vane is made of an elastic material and has one side connected to the corresponding second fixed jib.

7. The rotor for power driving as claimed in claim 5, wherein the outer vane is made of a rigid material and an elastic connecting member is installed between the outer vane and the corresponding second fixed jib, with the elastic connecting member having an internal end connected to the corresponding second fixed jib and an external end connected to the outer vane.

8. The rotor for power driving as claimed in claim 5, wherein each second fixed jib extends in a longitudinal direction perpendicular to the radial direction.

9. The rotor for power driving as claimed in claim 5, wherein each outer vane extends toward a direction tilt but not perpendicular to the radial direction.

10. The rotor for power driving as claimed in claim 2, wherein each first fixed jib includes a first end connected to the hub and a second end kept away from the hub, with the rotor further comprising:
 a plurality of second fixed jibs each engaged on the second end of one of the plurality of first fixed jibs; and
 a plurality of outer vanes each elastically fixed at a corresponding second fixed jib such that the plurality of outer vanes on which external forces act are elastically movable relative to the plurality of second fixed jibs and can rebound after removal of the external forces.

11. The rotor for power driving as claimed in claim 3, wherein each first fixed jib includes a first end connected to the hub and a second end kept away from the hub, with the rotor further comprising:
 a plurality of second fixed jibs each engaged on the second end of one of the plurality of first fixed jibs; and
 a plurality of outer vanes each elastically fixed at a corresponding second fixed jib such that the plurality of outer vanes on which external forces act are elastically movable relative to the plurality of second fixed jibs and can rebound after removal of the external forces.

12. The rotor for power driving as claimed in claim 4, wherein each first fixed jib includes a first end connected to the hub and a second end kept away from the hub, with the rotor further comprising:
 a plurality of second fixed jibs each engaged on the second end of one of the plurality of first fixed jibs; and
 a plurality of outer vanes each elastically fixed at a corresponding second fixed jib such that the plurality of outer vanes on which external forces act are elastically movable relative to the plurality of second fixed jibs and can rebound after removal of the external forces.

13. A rotor for power driving comprising:
 a hub adapted to be coupled with a shaft;
 a plurality of first fixed jibs installed around the hub circumferentially and spaced from one another, with each of the plurality of first fixed jibs extending in a radial direction perpendicular to an axial direction of the shaft and including a first end connected to the hub and a second end kept away from the hub;
 a plurality of second fixed jibs each engaged on the second end of one of the plurality of first fixed jibs; a plurality of inner vanes each elastically fixed at a corresponding first fixed jib; and
 a plurality of outer vanes each elastically fixed at a corresponding second fixed jib such that the plurality of outer vanes on which external forces act are elastically movable relative to the plurality of second fixed jibs and can rebound after removal of the external forces.

14. The rotor for power driving as claimed in claim 13, wherein the outer vane is made of an elastic material and has one side connected to the corresponding second fixed jib such that the plurality of outer vanes on which the external forces act make no rotary movement relative to the plurality of second fixed jibs but are bent.

15. The rotor for power driving as claimed in claim 13, wherein the outer vane is made of a rigid material and an elastic connecting member is installed between the outer vane and the corresponding second fixed jib, with the elastic connecting member having an internal end connected to the corresponding second fixed jib and an external end connected to the outer vane.

16. The rotor for power driving as claimed in claim 13, wherein the outer vane is made of a rigid material and at least one spring is installed between the outer vane and the corresponding second fixed jib, with two ends of the spring respectively abutting against the corresponding second fixed jib and the outer vane.

17. The rotor for power driving as claimed in claim 13, wherein each second fixed jib extends in a longitudinal direction perpendicular to the radial direction.

18. The rotor for power driving as claimed in claim 13, wherein each outer vane extends toward a direction tilt but not perpendicular to the radial direction.

* * * * *